US012576745B2

(12) United States Patent
Ehara et al.

(10) Patent No.: US 12,576,745 B2
(45) Date of Patent: Mar. 17, 2026

(54) SERVER, VEHICLE, AND POWER SUPPLY SYSTEM

(71) Applicant: TOYOTA JIDOSHA KABUSHIKI KAISHA, Toyota (JP)

(72) Inventors: Masato Ehara, Gotemba (JP); Daiki Yokoyama, Gotemba (JP); Yuki Takahashi, Susono (JP); Tomoya Takahashi, Ebina (JP); Tomoyuki Kubota, Susono (JP); Sachio Toyora, Gotemba (JP); Keisuke Fukuoka, Fujieda (JP); Zidan Xu, Yokohama (JP); Wenfeng Liang, Yokohama (JP); Hiroki Murata, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 715 days.

(21) Appl. No.: 18/054,041

(22) Filed: Nov. 9, 2022

(65) Prior Publication Data

US 2023/0226923 A1     Jul. 20, 2023

(30) Foreign Application Priority Data

Jan. 14, 2022     (JP) ................................. 2022-004214

(51) Int. Cl.
B60L 53/68          (2019.01)
B60L 9/00           (2019.01)
(Continued)

(52) U.S. Cl.
CPC ................. B60L 53/68 (2019.02); B60L 9/00 (2013.01); B60L 53/12 (2019.02); B60L 53/65 (2019.02);
(Continued)

(58) Field of Classification Search
CPC . Y02T 10/70; Y02T 90/12; B60L 9/00; B60L 53/12; B60L 53/68; B60L 53/65; B60L 2260/54; G06F 1/28; G01C 21/3469
See application file for complete search history.

(56) References Cited

U.S. PATENT DOCUMENTS

| | | | | |
|---|---|---|---|---|
| 8,698,642 | B2 * | 4/2014 | Taguchi | B60L 3/12 |
| | | | | 340/636.11 |
| 10,076,970 | B2 * | 9/2018 | Khosravi | B60L 50/15 |

(Continued)

FOREIGN PATENT DOCUMENTS

| | | |
|---|---|---|
| JP | 2015-095983 A | 5/2015 |
| JP | 2020-115707 A | 7/2020 |

*Primary Examiner* — S. Joseph Morano
*Assistant Examiner* — Cheng X Lin
(74) *Attorney, Agent, or Firm* — Finnegan, Henderson, Farabow, Garrett and Dunner, LLP

(57) ABSTRACT

A server configured to communicate with a first vehicle and a second vehicle, each of the first vehicle and the second vehicle including a power storage device configured to be charged by wirelessly receiving electric power from a power transmission device arranged on a road during traveling, the server includes: a storage device that stores information on a power shortage area; and a processor configured to: acquire a destination of the first vehicle and a destination of the second vehicle; and limit a charging operation for the second vehicle when the destination of the first vehicle is included in the power shortage area stored in the storage device, the destination of the second vehicle is not included in the power shortage area, and the first vehicle is charged on the road.

11 Claims, 12 Drawing Sheets

(51) Int. Cl.

| | |
|---|---|
| *B60L 53/12* | (2019.01) |
| *B60L 53/65* | (2019.01) |
| *G01C 21/34* | (2006.01) |
| *G06F 1/28* | (2006.01) |

(52) U.S. Cl.

CPC ........... *G01C 21/3469* (2013.01); *G06F 1/28* (2013.01); *B60L 2260/54* (2013.01); *Y02T 10/70* (2013.01); *Y02T 90/12* (2013.01)

(56) References Cited

U.S. PATENT DOCUMENTS

| | | | |
|---|---|---|---|
| 2013/0151293 A1* | 6/2013 | Karner .................... | B60L 53/65 |
| | | | 705/5 |
| 2019/0122561 A1* | 4/2019 | Shimizu ............... | G05D 1/0088 |
| 2019/0381903 A1* | 12/2019 | Shin ...................... | G07F 15/005 |
| 2020/0231058 A1* | 7/2020 | Hishida .................. | B60L 55/00 |

* cited by examiner

| AREA | POWER SHORTAGE INFORMATION | PRIORITY LEVEL |
|---|---|---|
| AREA A | SUFFERING FROM DISASTER | 1 |
| AREA B | ---- | ---- |
| AREA C | EXCESSIVE POWER DEMAND | 3 |
| AREA D | ---- | ---- |
| . . . | . . . | . . . |
| AREA Z | POWER OUTAGE (ABNORMALITY IN POWER FACILITY) | 2 |

SERVER, VEHICLE, AND POWER SUPPLY SYSTEM

CROSS-REFERENCE TO RELATED APPLICATION

This application claims priority to Japanese Patent Application No. 2022-004214 filed on Jan. 14, 2022, incorporated herein by reference in its entirety.

BACKGROUND

1. Technical Field

The present disclosure relates to a server, a vehicle, and a power supply system, and more specifically, to power supply control for a vehicle chargeable with electric power received contactlessly during traveling.

2. Description of Related Art

Japanese Unexamined Patent Application Publication No. 2015-095983 (JP 2015-095983 A) discloses a charging/discharging management system that reduces an electricity bill for electric power purchased from a commercial power supply by connecting a battery electric vehicle to an electric system of a residence via a charging/discharging stand and using charging and discharging of a power storage device (battery) mounted on the battery electric vehicle. JP 2015-095983 A discloses contactless (wireless) power reception and discharging as one type of electric power transmission between the electric system of the residence and the vehicle.

SUMMARY

In recent years, as a contactless power supply method for vehicles, "power supply during traveling" in which electric power is supplied from a power transmission device arranged on a road while the vehicle is traveling has been researched in addition to "power supply during stop" in which electric power is supplied to the vehicle while the vehicle is stopped. By applying such "power supply during traveling", it is possible to transport electric power to a distant place by using a battery electric vehicle.

In an area with difficulty in securing electric power, such as an area where a disaster such as an earthquake has occurred or an area where a power outage has occurred due to a failure in a power transmission and distribution facility, or in a case where the amount of power demand temporarily increases due to some event and presumably exceeds the amount of power supply, more electric power can be transported to the target area by charging a battery of a vehicle heading for the target area by the "power supply during traveling".

However, vehicles traveling on roads have various destinations, and there is a limit to electric power that can be supplied from the power transmission device. Therefore, when electric power is supplied from the same power transmission device to many vehicles at the same time, the electric power that can be supplied to vehicles whose destinations are an area requiring electric power (hereinafter referred to also as "power shortage area") decreases. There is a possibility that the electric power that can be transported to the power shortage area cannot be secured sufficiently.

The present disclosure provides a power supply system which is capable of power supply during traveling and can secure more electric power that can be supplied to a power shortage area.

A server according to a first aspect of the present disclosure is configured to communicate with a first vehicle and a second vehicle. Each of the first vehicle and the second vehicle includes a power storage device configured to be charged by wirelessly receiving electric power from a power transmission device arranged on a road during traveling. The server includes a storage device that stores information on a power shortage area; and a processor configured to: acquire a destination of the first vehicle and a destination of the second vehicle; and limit a charging operation for the second vehicle when the destination of the first vehicle is included in the power shortage area stored in the storage device, the destination of the second vehicle is not included in the power shortage area, and the first vehicle is charged on the road.

A power supply system according to a second aspect of the present disclosure includes a power transmission device arranged on a road; a first vehicle and a second vehicle; and a server configured to communicate with the first vehicle and the second vehicle, wherein: each of the first vehicle and the second vehicle includes a power storage device configured to be charged with electric power wirelessly received from the power transmission device during traveling; the server includes: a processor; and a storage device that stores information on a power shortage area; and the processor is configured to: acquire a destination of the first vehicle and a destination of the second vehicle; and limit a charging operation for the second vehicle when the destination of the first vehicle is included in the power shortage area stored in the storage device, the destination of the second vehicle is not included in the power shortage area, and the first vehicle is charged on the road.

A vehicle according to a third aspect of the present disclosure is configured to communicate with a server and wirelessly receive electric power from a power transmission device arranged on a road during traveling. The vehicle includes a power reception device configured to receive the electric power from the power transmission device; a power storage device configured to be charged with the electric power received by the power reception device; and a processor, wherein: the server stores information on a power shortage area; and the processor is configured to, when a destination of the vehicle is included in the power shortage area acquired from the server and the power storage device is charged with the electric power from the power transmission device arranged on a route to the destination: acquire information on a destination of a specific vehicle traveling on and around the power transmission device; and request the server to limit a charging operation for the specific vehicle when the destination of the specific vehicle is not included in the power shortage area.

According to the power supply system of the present disclosure, in the system capable of contactlessly supplying electric power to traveling vehicles, the power supply to the vehicle whose destination is not the power shortage area is limited. Therefore, the electric power can be supplied, with priority, to the vehicle whose destination is the power shortage area. Thus, it is possible to secure more electric power that can be supplied to the power shortage area.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is an overall schematic diagram of a power supply system according to a first embodiment;

FIG. 3 is a diagram showing an example of information about power shortage areas that is stored in a server;

DETAILED DESCRIPTION OF EMBODIMENTS

Figure 2:
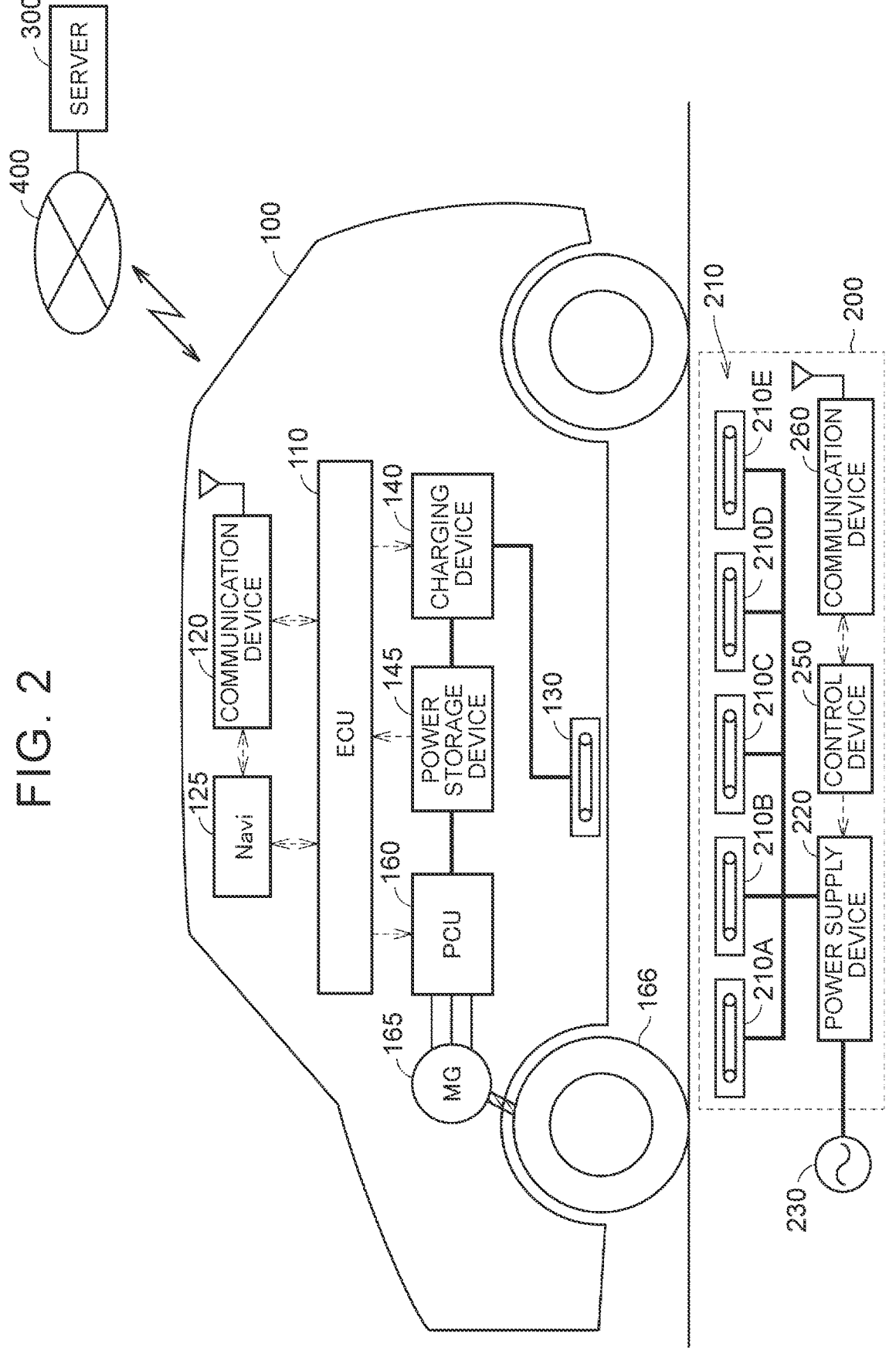
FIG. 2 is a functional block diagram illustrating details of a vehicle and power supply equipment in FIG. 1.

Hereinafter, embodiments of the present disclosure will be described in detail with reference to the drawings. The same or corresponding portions are denoted by the same signs throughout the drawings, and description thereof will not be repeated.

First Embodiment

Overview of System

Figure 1:
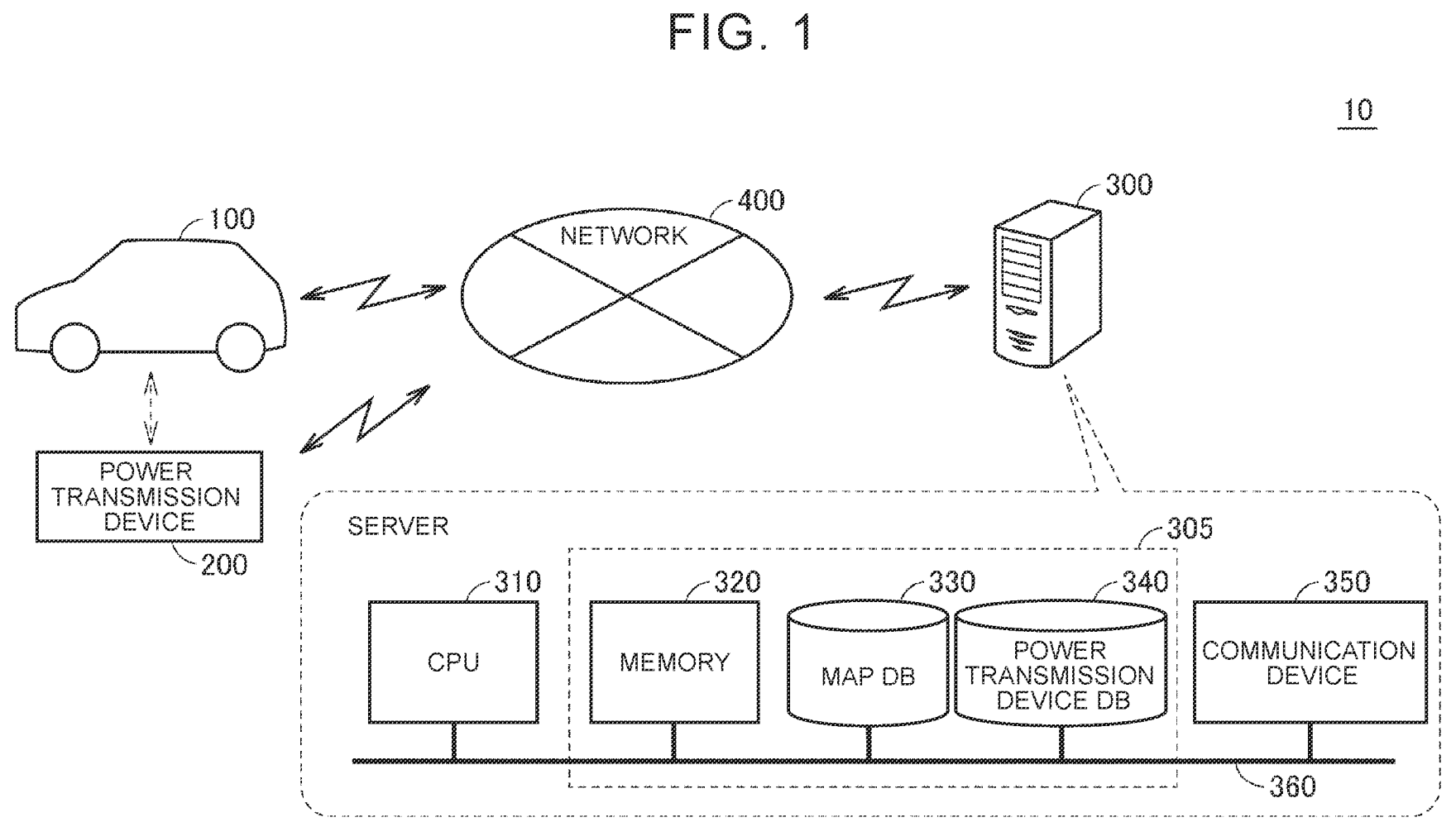

FIG. 1 is an overall schematic diagram of a power supply system 10 including a vehicle 100 according to the present embodiment. Referring to FIG. 1, the power supply system 10 includes the vehicle 100, a power transmission device 200, and a server 300. The vehicle 100, the power transmission device 200, and the server 300 are communicable with each other via a communication network 400 such as the Internet. Communication between the vehicle 100 and the communication network 400 is performed by wireless. Communication between the power transmission device 200 and the communication network 400 and/or communication between the server 300 and the communication network 400 may be performed by wire or wireless. The power transmission device 200 is arranged on a road. The vehicle 100 can contactlessly receive electric power from the power transmission device 200.

When the server 300 receives destination information from the vehicle 100, the server 300 searches for a traveling route (route) from a current position of the vehicle 100 to the destination by using map information, and transmits route information to the vehicle 100. In the vehicle 100, a user selects one of the traveling routes presented by the server 300. The server 300 gives guidance on the traveling route selected by the user along with the traveling of the vehicle 100.

The route information includes information on the power transmission device 200 arranged on each traveling route.

When the vehicle 100 reaches the power transmission device 200 arranged on the selected traveling route, the server 300 causes the power transmission device 200 to output electric power to charge the vehicle 100.

The server 300 includes a processor 310, a storage device 305, and a communication device 350. The storage device 305 includes a memory 320, a map database (DB) 330, and a power transmission device database 340. The processor 310, the memory 320, the map database 330, the power transmission device database 340, and the communication device 350 are connected to each other by a common bus 360, and can exchange information with each other.

The processor 310 is, for example, a central processing unit (CPU), and executes a predetermined arithmetic process described in a program. The memory 320 includes a read only memory (ROM) and a random access memory (RAM). The ROM stores programs to be executed by the processor 310. The RAM temporarily stores data generated by executing the programs by the processor 310, and data input via the communication device 350. The RAM also functions as a temporary data memory that is used as a working area.

The communication device 350 is a communication interface for exchanging data the vehicle 100 via the communication network 400. As described above, the communication between the server 300 and the communication network 400 is performed by wire or wireless.

The map database 330 stores map information including road information. When the processor 310 receives information on a current position and a destination transmitted from the vehicle 100, the processor 310 refers to the map information included in the map database 330 to search for candidates for a traveling route from the current position to the destination. The map database 330 also stores information indicating a power supply and demand status in each area on the map. The processor 310 determines whether the destination of the vehicle 100 is a "power shortage area" based on the information on the power supply and demand status stored in the map database 330.

The power transmission device database 340 stores information about the power transmission device 200 arranged on a road. The information about the power transmission device 200 includes position information and specification information of the power transmission device 200. The processor 310 acquires the information about the power transmission device 200 arranged on each traveling route from the power transmission device database 340 in the search for traveling route candidates. As described later, when the vehicle 100 is a vehicle whose destination is the "power shortage area", the processor 310 causes the power transmission device 200 to supply electric power to the vehicle 100 with priority.

Configurations of Vehicle and Power Transmission Device

Next, detailed configurations of the vehicle 100 and the power transmission device 200 will be described with reference to FIG. 2. First, the configuration of the vehicle 100 will be described with reference to FIG. 2. The vehicle 100 includes an electronic control unit (ECU) 110 serving as a control device, a communication device 120, a navigation device 125, a power reception coil 130, a charging device 140, a power storage device (battery) 145, a power control unit (PCU) 160 serving as a drive device, and a motor generator (MG) 165.

The power reception coil 130 is arranged on the lower surface of a floor panel that defines the bottom surface of the vehicle 100. The power reception coil 130 contactlessly receives electric power transmitted from the power transmission device 200. The electric power received by the power reception coil 130 is output to the charging device 140.

The charging device 140 includes, for example, an alternating current (AC) to direct current (DC) converter or a rectifier. The charging device 140 is controlled by the ECU 110 to charge the battery 145 by converting AC power received by the power reception coil 130 into DC power suitable for charging the battery 145. The battery 145 is an assembled battery including a plurality of cells. Each cell included in the battery 145 is a secondary battery such as a lithium ion battery or a nickel metal hydride battery.

The PCU 160 includes, for example, a DC/DC converter and an inverter. The PCU 160 converts DC power from the battery 145 into AC power to drive the MG 165. The MG 165 is a rotary electrical machine that is driven by AC power from the PCU 160 and applies a driving torque to driving wheels 166 to cause the vehicle 100 to travel.

The communication device 120 is a communication interface for exchanging signals with the server 300 via the communication network 400. The communication device 120 is also communicable with a communication device 260 of the power transmission device 200. The communication between the communication device 120 and the communication network 400 and between the communication device 120 and the power transmission device 200 is performed by wireless.

The navigation device 125 includes a touch panel (not shown), and presents and gives guidance on a traveling route to a destination specified by the user. The navigation device 125 transmits destination information input by the user to the server 300 via the communication device 120. The navigation device 125 receives information on candidates for a traveling route to the destination that are obtained by the search performed by the server 300, and displays the information on the touch panel. When the user selects a desired traveling route from among the displayed candidates, the navigation device 125 guides the user based on the selected traveling route. The navigation device 125 displays information transmitted from the server 300 and gives voice notification.

Next, the configuration of the power transmission device 200 will be described. The power transmission device 200 includes a power transmission unit 210, a power supply device 220, a control device 250, and the communication device 260. The power transmission unit 210 includes a plurality of power transmission coils 210A to 210E. Although FIG. 2 shows an example in which the power transmission device 200 includes five power transmission coils 210A to 210E arranged in a row on a road surface, the number of power transmission coils is not limited to five, and may be four or less or six or more. The power transmission coils may be arranged in a plurality of rows along the road surface.

The control device 250 includes a CPU and a memory (not shown), and centrally controls other devices in the power transmission device 200. Specifically, the control device 250 selects a power transmission coil to be used for power transmission and determines electric power to be supplied to the power transmission coil based on information received from the vehicle 100 via the communication device 260 and information transmitted from the server 300.

The communication device 260 is a communication interface for communicating with the vehicle 100 by wireless. The control device 250 transmits and receives, via the communication device 260, vehicle position information, information on specifications of a power reception device, information on a state of charge (SOC) of the battery 145, billing information, and the like.

The power transmission coils 210A to 210E are connected to the power supply device 220. The power supply device 220 is connected to an AC power supply 230 arranged outside the power transmission device 200. In response to a command from the control device 250, the power supply device 220 converts AC power received from the AC power supply 230 into AC power having a predetermined frequency, and outputs the AC power to the power transmission coils 210A to 210E. At this time, the control device 250 causes, based on the position of the vehicle 100, the AC power supply 230 to supply the AC power to a power transmission coil above which the power reception coil 130 of the vehicle 100 is located among the power transmission coils 210A to 210E.

More specifically, for example, when the power reception coil 130 is located above the power transmission coil 210B to face the power transmission coil 210B, the control device 250 causes the power supply device 220 to supply AC power to the power transmission coil 210B. An electromagnetic field is formed around the power transmission coil 210B by an alternating current flowing through the power transmission coil 210B. The power reception coil 130 of the vehicle 100 contactlessly receives electric power from the power transmission coil 210B through the electromagnetic field formed by the power transmission coil 210B.

When the power reception coil 130 has left from above the power transmission coil 210B, the control device 250 controls the power supply device 220 to stop supplying AC power to the power transmission coil 210B. By performing such serial control on each of the power transmission coils 210A to 210E, "power supply during traveling" can be performed to contactlessly transmit electric power to the traveling vehicle 100. Even while the vehicle 100 is stopped above the power transmission device 200, electric power can contactlessly be transmitted from the power transmission device 200 to the vehicle 100. The power transmission coils 210A to 210E may be arranged on the road surface of a traveling lane or at a position where the vehicle stops at an intersection to wait at traffic lights.

The control device 250 determines whether the power reception coil is located above each power transmission coil based on a sensor (not shown) provided in the power transmission device 200 and/or vehicle position data transmitted from the vehicle 100.

Priority Power Supply Control

By applying such "power supply during traveling", it is possible to transport electric power to a distant place by using the vehicle 100 as a power supply vehicle. In an area with difficulty in securing electric power, such as an area when a disaster such as an earthquake has occurred or an area where a power outage has occurred due to a failure in a power transmission and distribution facility, or in a case where the amount of power demand temporarily increases due to some event and presumably exceeds the amount of power supply, more electric power can be transported to the target area by charging a battery of a vehicle heading for the target area by the power supply during traveling.

However, vehicles traveling on roads have various destinations, and there is a limit to electric power that can be supplied from the power transmission device. Therefore, when electric power is supplied from the same power transmission device to many vehicles at the same time, the electric power that can be supplied to vehicles whose destinations are an area requiring electric power (power shortage area) decreases. There is a possibility that the electric power that can be transported to the power shortage area cannot be secured sufficiently.

In the power supply system 10 of the first embodiment, when performing the power supply during traveling from the same power transmission device to a plurality of vehicles, "priority power supply control" is executed to supply, with priority, electric power to a vehicle whose destination is the power shortage area. By performing such control, it is possible to secure more electric power that can be supplied to the power shortage area.

The vehicles whose destinations are the power shortage area are not limited to the vehicle requested as the power supply vehicle, and include a vehicle heading for the area for other purposes. Even in the case of the vehicle visiting the power shortage area for other purposes, there is such an effect that the power consumption in the power shortage area can be reduced by suppressing charging in the area.

FIG. 3 is a diagram showing an example of information about power shortage areas that is stored in the map database 330 of the server 300. In the map database 330, power shortage information and a priority level are stored in association with each area on the map. The area may be, for example, an administrative division such as a municipality, or a division based on a facility such as a factory, a hospital, or a commercial facility.

The power shortage information includes, for example, information on an area suffering from a disaster such as an earthquake or a flood, and information on a shortage due to a temporary increase in power demand or a power outage due to a failure in a power transmission and distribution facility. In the example of FIG. 3, an area A is an area suffering from a disaster, an area C is an area with excessive power demand, and an area Z is an area where a power outage has occurred due to a failure in a power facility. In an area B and an area D, there is no power shortage. A priority level is set for each factor of the power shortage. A high priority level is set for a factor with a high degree of urgency.

The server 300 determines whether the destination transmitted from the vehicle 100 is included in the area specified as the power shortage area in FIG. 3. When the destination corresponds to the power shortage area, the server 300 performs, with priority, the power supply during traveling to a vehicle whose destination is the power shortage area rather than a vehicle whose destination is an area other than the power shortage area.

Figure 4:
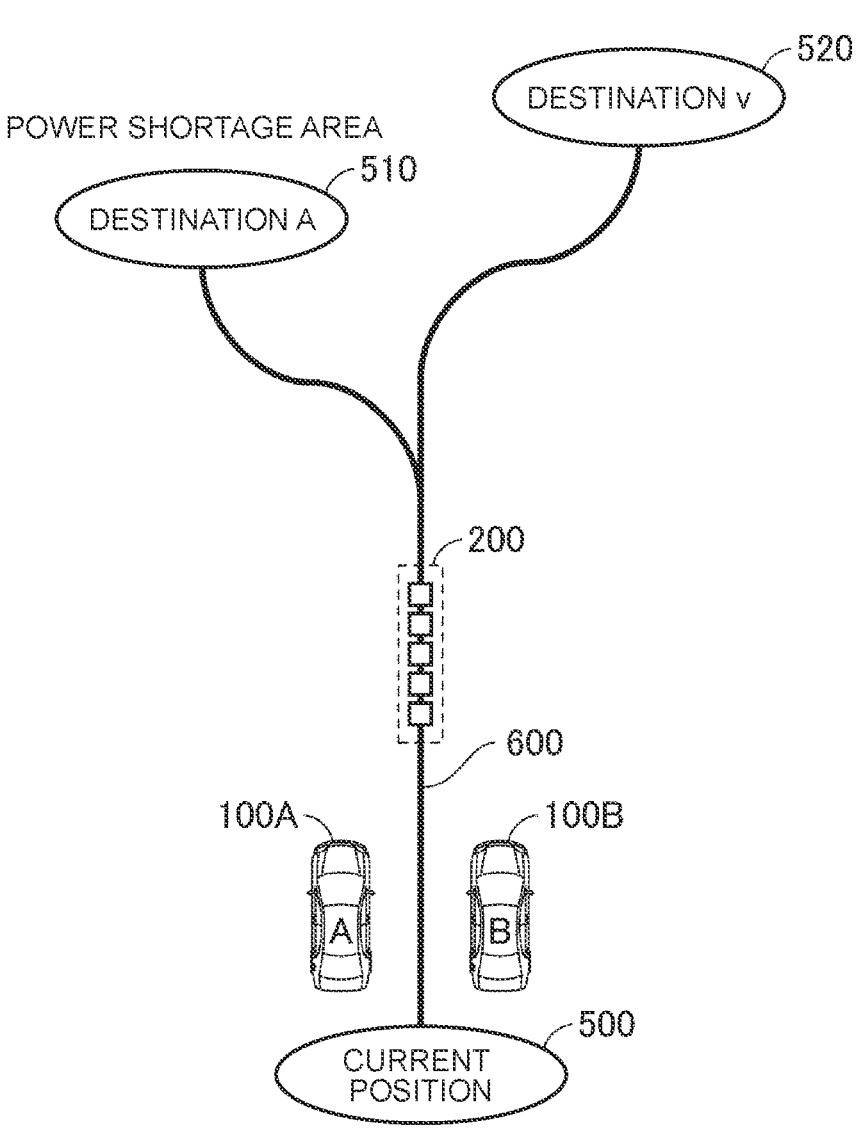
FIG. 4 is a first diagram illustrating an overview of priority power supply control the first embodiment.
Figure 5:
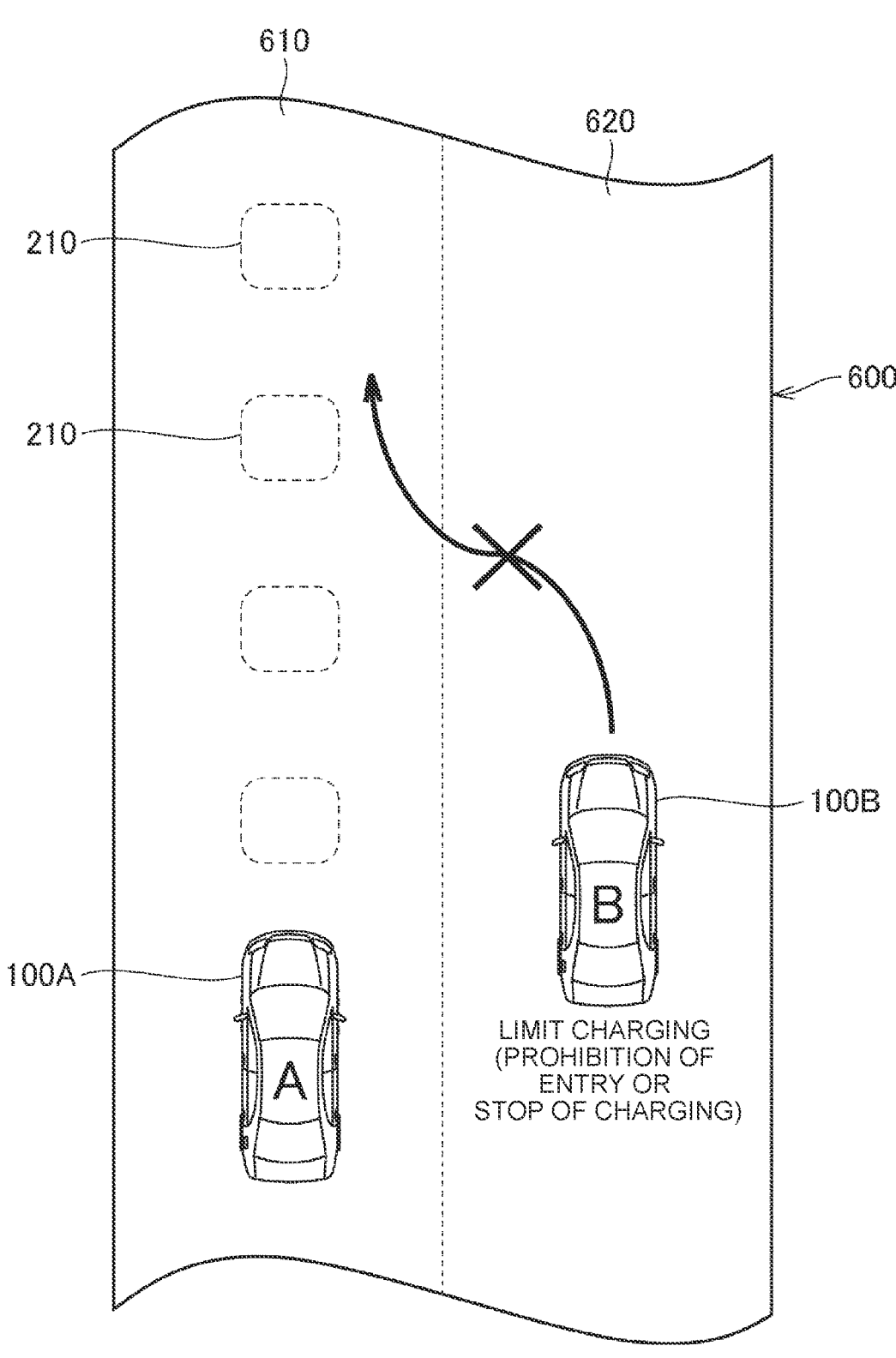
FIG. 5 is a second diagram illustrating the overview of the priority power supply control in the first embodiment.

Next, an overview of the priority power supply control in the first embodiment will be described with reference to FIGS. 4 and 5. Referring to FIGS. 4 and 5, it is assumed that two vehicles 100A and 100B are heading from a current position 500 for a destination A 510 and a destination B 520, respectively. The destination A 510 is included in the power shortage area shown in FIG. 3, and the destination B 520 is not included in the power shortage area. The vehicles 100A and 100B travel on a road 600 where the power transmission device 200 is arranged on routes from the current position 500 to the respective destinations. In this case, the vehicle 100A whose destination is the power shortage area is a target vehicle for the priority power supply control, but the vehicle 100B is not a target vehicle but is a non-target vehicle.

As shown in FIG. 5, the road 600 includes a power supply lane (first lane) 610 where the power transmission unit 210 of the power transmission device 200 is arranged, and a general lane (second lane) 620 where the power transmission device 200 is not arranged. The power supply during traveling is performed while the vehicle is traveling on the power supply lane 610.

When the vehicle 100A whose destination is the power shortage area reaches an area where the power transmission device 200 is arranged in the power supply lane 610, the server 300 transmits, to the vehicle 100B that is the non-target vehicle, information indicating that entry from the general lane 620 to the power supply lane 610 is prohibited. When the entry prohibition information is received from the server 300, the vehicle 100B displays the information on, for example, a display of the navigation device 125 to alert a driver of the vehicle 100B. In addition to the display of the information on the display, the information may be transmitted to the driver by voice.

When the vehicle 100B is executing the power supply during traveling in the power supply lane 610, the server 300 may notify the vehicle 100B of a request to leave the power supply lane 610, and prompt the driver of the vehicle 100B to change the traveling lane and suspend the power supply during traveling.

By notifying the non-target vehicle of the information for prohibiting the entry from the general lane into the power supply lane and/or the information on the request to leave the power supply lane, the power supply during traveling can be executed with priority for the vehicle 100A that is the target vehicle.

When the road 600 has only one lane that is the power supply lane 610 and the vehicle 100B cannot leave the power supply lane 610, or when the driver of the vehicle 100B continues to travel in the power supply lane despite the notification, the server 300 supplies electric power to the vehicle 100A with priority by reducing electric power to be supplied to the vehicle 100B or forcibly stopping the power supply.

Figure 6:
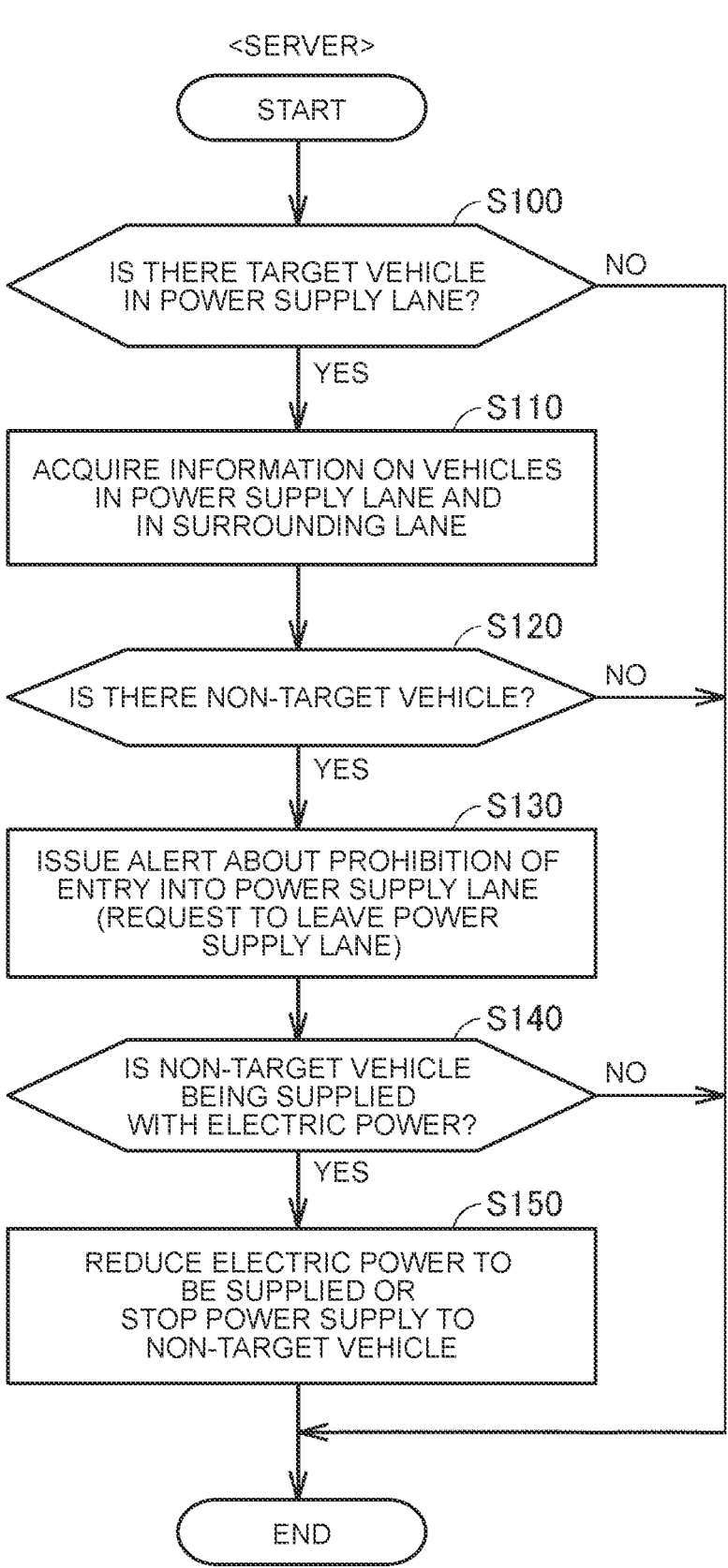
FIG. 6 is a flowchart illustrating a process of the priority power supply control to be executed by the server in the first embodiment.

FIG. 6 is a flowchart illustrating a process of the priority power supply control to be executed by the server 300. The process in the flowchart of FIG. 6 is called from a main routine and executed by the processor 310 of the server 300 when a predetermined condition is satisfied. For example, the server 300 executes the process in the flowchart of FIG. 6 every time a new vehicle has entered a range of the power transmission device 200 in the power supply lane 610.

Each step in the flowchart is implemented by software processing of the processor 310, but a part or all of the steps may be implemented by hardware such as large scale integration (LSI).

In Step (hereinafter abbreviated as "S") 100 of FIG. 6, the server 300 acquires information about a destination from each vehicle traveling in the range of the power transmission device 200 in the power supply lane 610, and determines whether there is a target vehicle for the priority power supply control whose destination is the power shortage area. When the target vehicle is not present (NO in S100), the priority power supply control by the power transmission device 200 is not necessary. Therefore, the server 300 skips the subsequent process to terminate the process.

When the target vehicle is present in the range of the power transmission device 200 (YES in S100), the server 300 advances the process to S110 to acquire information on other vehicles in the power supply lane 610 and in the surrounding general lane 620. In S120, the server 300 determines whether these vehicles include a non-target vehicle.

When the non-target vehicle is not included (NO in S120), the priority power supply control is not necessary. Therefore, the server 300 skips the subsequent process to terminate the process. When the non-target vehicle is included (YES in S120), the server 300 advances the process to S130 to alert the non-target vehicle that the non-target vehicle cannot enter the power supply lane 610 and/or notify the non-target vehicle of a request to leave the power supply lane 610.

In S140, the server 300 determines, after an elapse of a predetermined period from the notification in S130, whether the non-target vehicle remains in the power supply lane 610 and the power supply operation continues for the non-target vehicle. When the power supply operation is not performed for the non-target vehicle (NO in S140), the server 300 terminates the process. When the power supply operation continues for the non-target vehicle (YES in S140), the power supply to the non-target vehicle is stopped in S150. The power supply to the non-target vehicle may be continued by, for example, reducing the electric power to be supplied as long as the suppliable electric power of the power transmission device 200 is not exceeded.

By performing the control in accordance with the process described above, the power supply during traveling can be performed with priority for the vehicle whose destination is the power shortage area, thereby securing more electric power that can be supplied to the power shortage area.

The "vehicle 100A" and the "vehicle 100B" in the first embodiment correspond to examples of a "first vehicle" and a "second vehicle" in the present disclosure, respectively. The "power supply lane 610" and the "general lane 620" in the first embodiment correspond to examples of a "first lane" and a "second lane" in the present disclosure, respectively.

First Modification

In the first embodiment, description has been given of the example in which the server 300 executes the priority power supply control. In a first modification, description will be given of a case where the target vehicle performs the determination in the priority power supply control.

Figure 7:
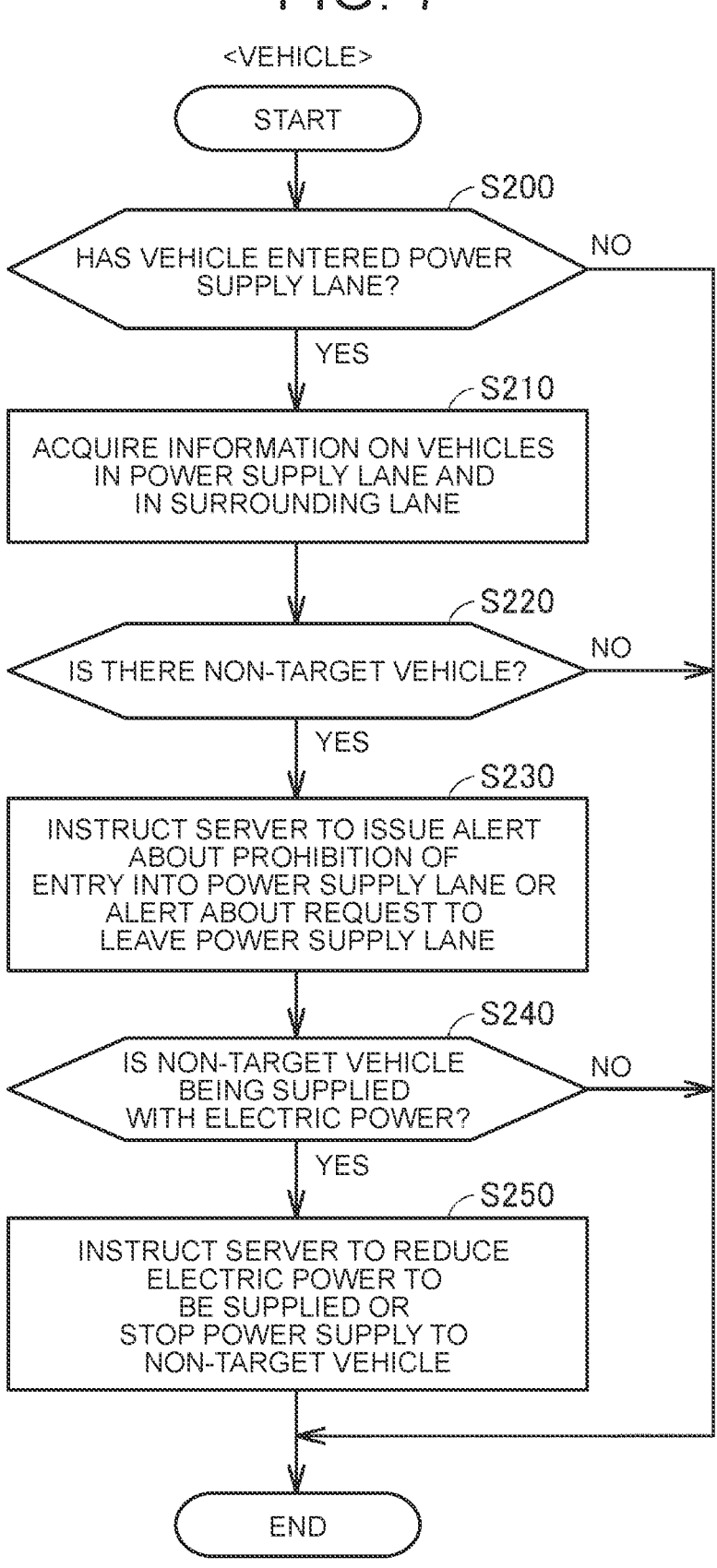
FIG. 7 is a flowchart illustrating a process of the priority power supply control to be executed by the vehicle in a first modification.

FIG. 7 is a flowchart illustrating a process of the priority power supply control in the first modification. In the first modification, the process is executed by the ECU 110 of the vehicle 100 that is the target vehicle. Although illustration is omitted in FIG. 7, the vehicle 100 receives information on the power shortage area from the server 300, and recognizes the vehicle 100 as the target vehicle when the destination of the vehicle 100 is included in the power shortage area received from the server 300. When the vehicle 100 does not correspond to the target vehicle, the process in FIG. 7 is not executed.

In S200 of FIG. 7, the vehicle 100 that is the target vehicle determines whether the vehicle 100 has entered the range of the power transmission device 200 in the power supply lane 610. When the vehicle 100 has not entered the range of the power transmission device 200 (NO in S200), the vehicle 100 skips the subsequent process to terminate the process. The area "in the range of the power transmission device 200" may include an area that is a predetermined distance (for example, 100 m) behind the power transmission unit 210 in addition to the area where the power transmission unit 210 is actually arranged.

When the vehicle 100 is in the range of the power transmission device 200 (YES in S200), the process proceeds to S210, and the vehicle 100 acquires information on vehicles traveling in the power supply lane 610 and in the surrounding general lane 620 from the server 300 or by vehicle-to-vehicle communication. In S220, the vehicle 100 determines whether the surrounding vehicles include a non-target vehicle.

When the surrounding vehicles do not include the non-target vehicle (NO in S220), the vehicle 100 skips the subsequent process to terminate the process.

When the surrounding vehicles include the non-target vehicle (YES in S220), the process proceeds to S230, and the vehicle 100 instructs the server 300 to alert the non-target vehicle that the non-target vehicle cannot enter the power supply lane 610 and/or notify the non-target vehicle of a request to leave the power supply lane 610. In response to the instruction from the vehicle 100, the server 300 notifies the non-target vehicle that the non-target vehicle cannot enter the power supply lane 610 and/or of the request to leave the power supply lane 610.

In S240, the vehicle 100 determines whether the power supply to the non-target vehicle continues in the power supply lane 610 even after the notification in S230. When electric power is not supplied to the non-target vehicle (NO in S240), the vehicle 100 skips S250 to terminate the process. When the power supply to the non-target vehicle continues (YES in S240), the process proceeds to S250, and the vehicle 100 notifies the server 300 of an instruction to limit the power supply operation for the non-target vehicle. In response to the notification, the server 300 limits the power supply operation for the non-target vehicle.

By performing the control in accordance with the process described above, the priority power supply control can be executed in the target vehicle.

Second Embodiment

In a second embodiment, description will be given of an example in which there is another vehicle whose destination is a different area included in the power shortage area.

Figure 8:
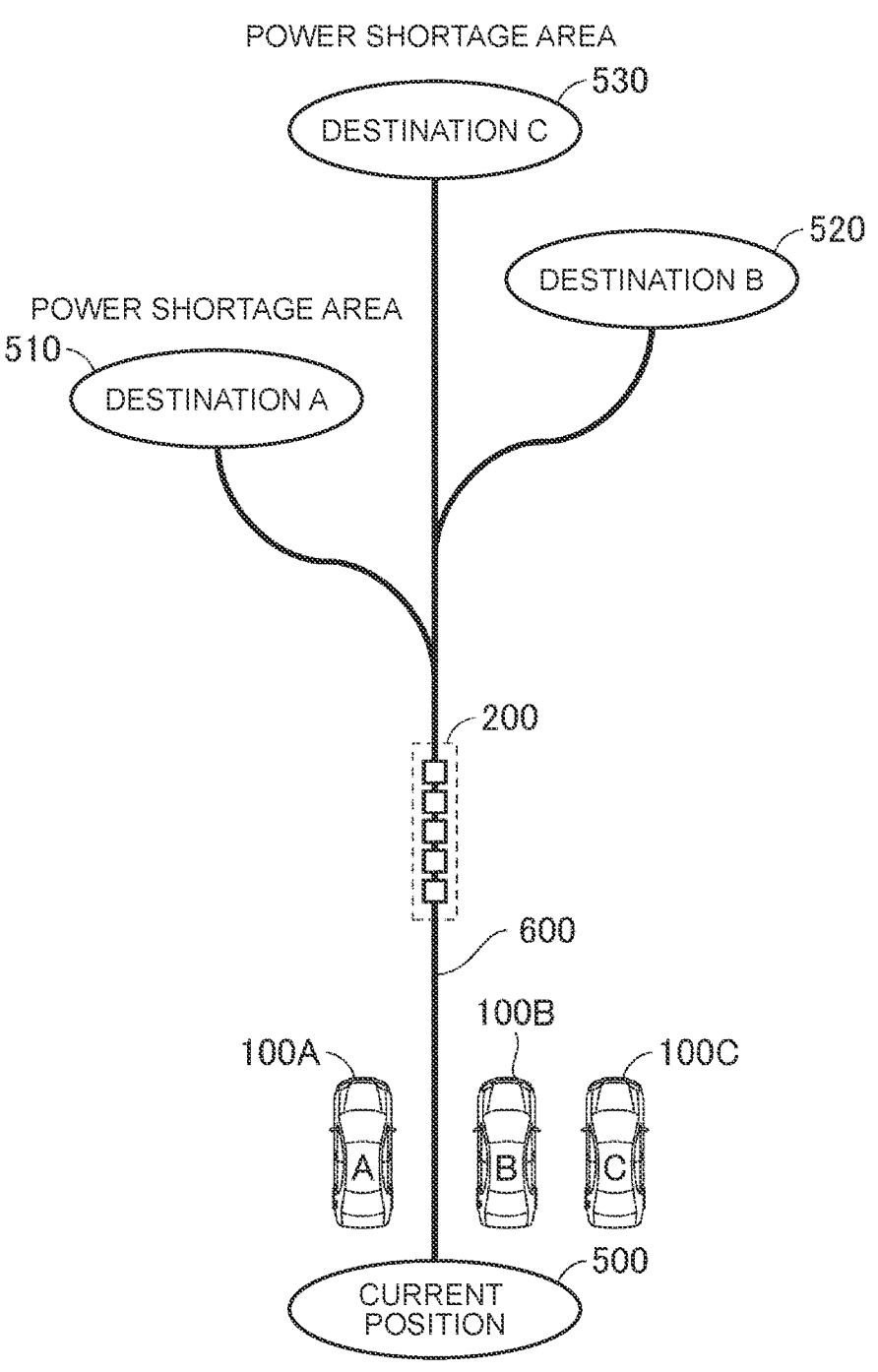
FIG. 8 is a first diagram illustrating an overview of priority power supply control in a second embodiment.
Figure 9:
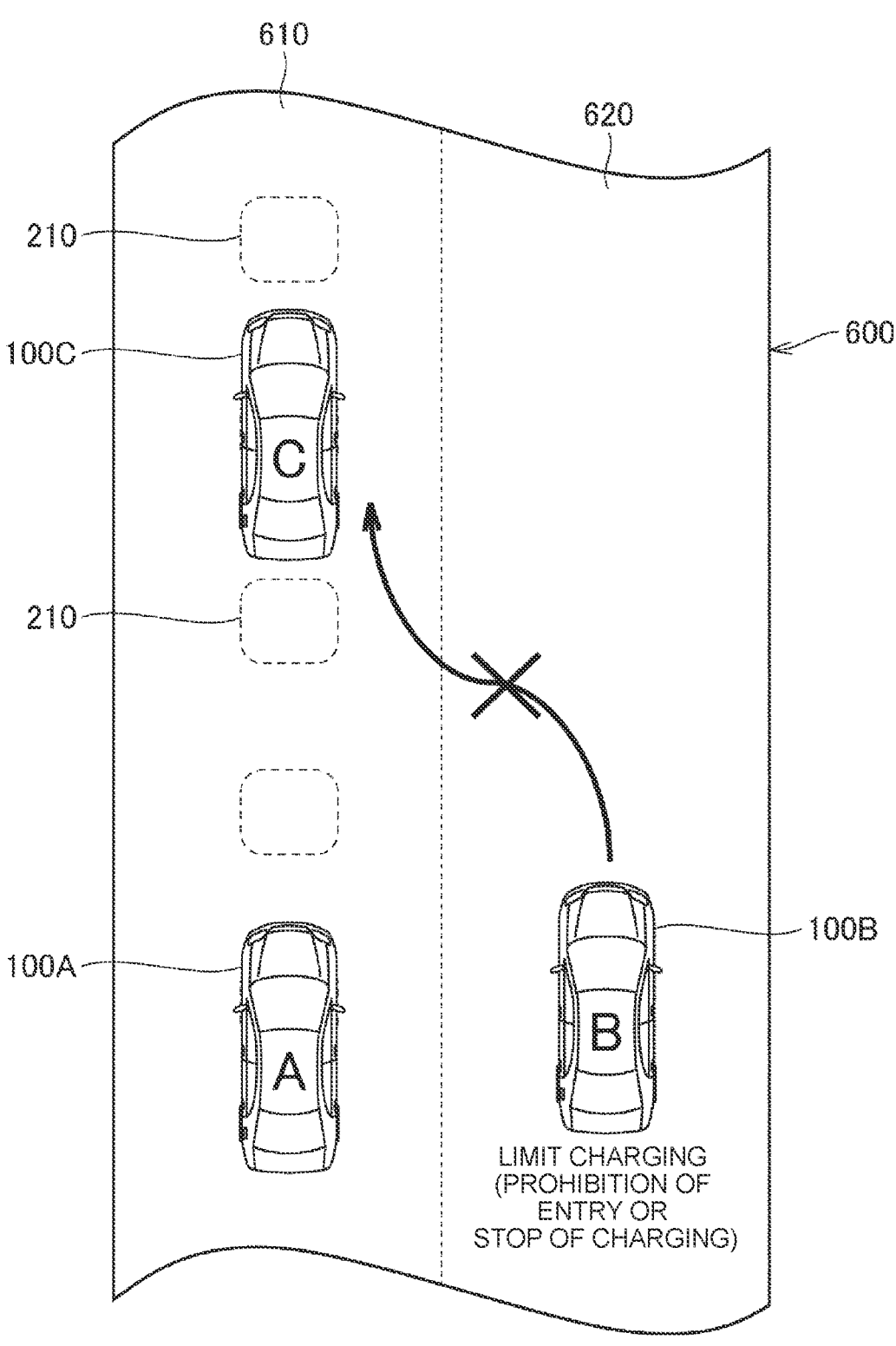
FIG. 9 is a second diagram illustrating the overview of the priority power supply control in the second embodiment.

FIGS. 8 and 9 are diagrams illustrating an overview of priority power supply control in the second embodiment. Referring to FIGS. 8 and 9, in the second embodiment, it is assumed that a vehicle 100C is added to the vehicles 100A and 100B described with reference to FIG. 4. The destination of the vehicle 100C is a destination C 530 different from those of the vehicles 100A and 100B. The destination C 530 is included in the power shortage area stored in the map database 330 of the server 300 similarly to the destination A 510. Therefore, the vehicle 100C is also a target vehicle for the priority power supply control.

In this case, the process shown in the flowchart of FIG. 6 or FIG. 7 is applied to both the vehicle 100A and the vehicle 100C, and the power supply during traveling is performed for the vehicles 100A and 100C.

For the vehicle 100B that is the non-target vehicle, a notification is given about prohibition of entry into the power supply lane 610 or about a request to leave the power supply lane 610, and the power supply operation is limited by reducing or stopping electric power to be supplied.

Even when the vehicles with different destinations included in the power shortage area are concurrently present in the range of the same power transmission device, electric power can be supplied to the plurality of target vehicles with priority by limiting the power supply operation for the non-target vehicle. Thus, it is possible to secure more electric power that can be supplied to each power shortage area.

Second Modification

Figure 10:
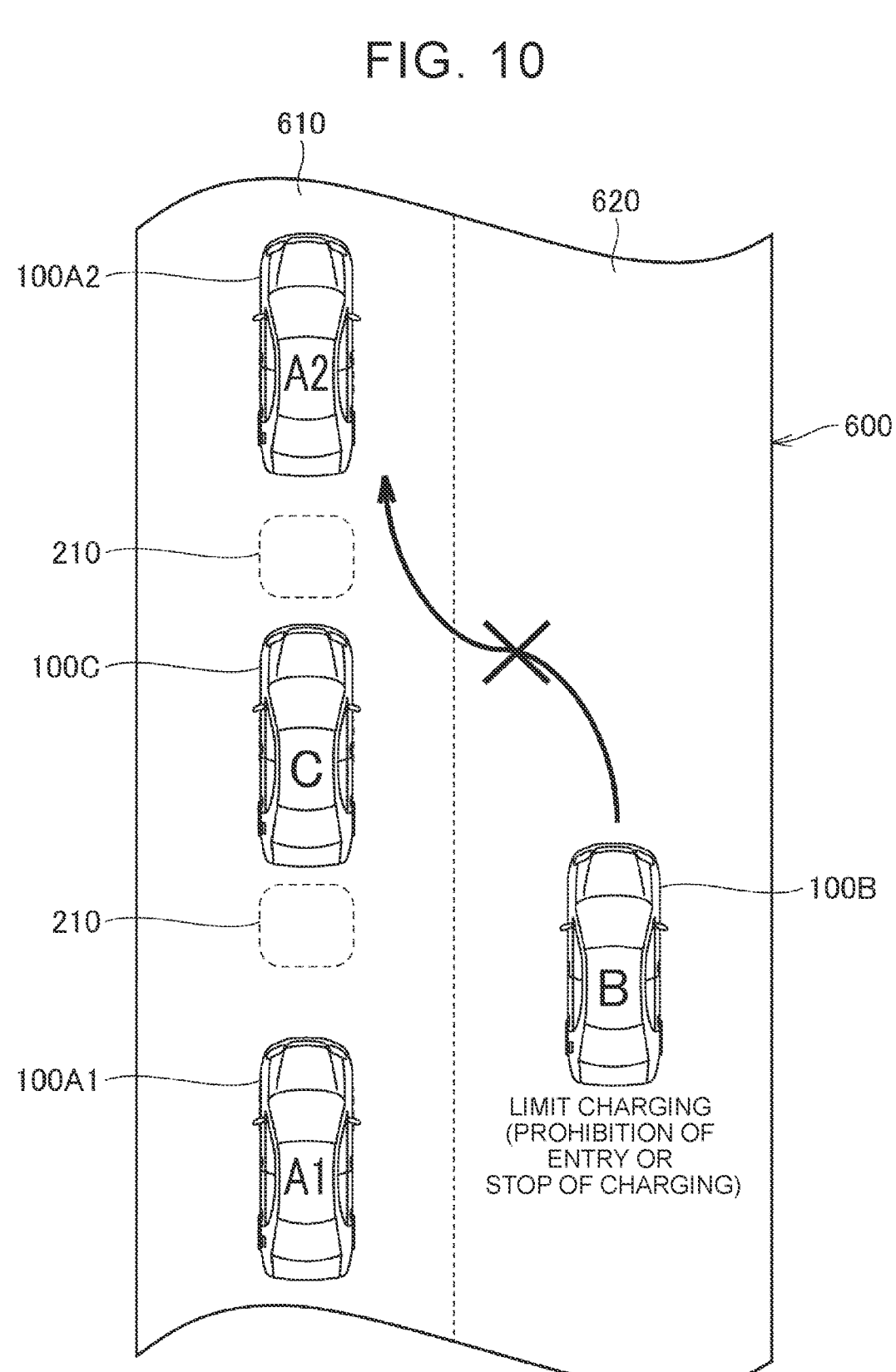
FIG. 10 is a diagram illustrating an overview of the priority power supply control in a second modification.

The configuration described above is also applicable to a case where a plurality of vehicles heading for the same destination included in the power shortage area is present in the range of the same power transmission device in place of or in addition to the vehicle 100C in FIGS. 8 and 9. For example, when vehicles 100A1 and 100A2 heading for the destination A 510 and the vehicle 100C heading for the destination C 530 are traveling in the power supply lane 610 as shown in FIG. 10, it is possible to secure more electric power that can be supplied to each power shortage area h applying the priority power supply control to the vehicles 100A1, 100A2, and 100C.

Third Embodiment

In the second embodiment, description has been given of the case where, when a plurality of target vehicles whose destinations are the power shortage area is concurrently present in the range of the same power transmission device, the priority power supply control is applied to these target vehicles. However, there is a limit to the maximum electric power that can be supplied from the power transmission device. When the number of target vehicles increases, the electric power that can be supplied to one vehicle per unit time decreases. Therefore, there is a possibility that sufficient electric power cannot be supplied to the target vehicles within a period in which the target vehicles are traveling in the power transmission range in the power supply lane.

In a third embodiment, description will be given of a configuration in which, when the number of target vehicles to be supplied with electric power increases, electric power is supplied to some vehicles selected from among the target vehicles, thereby supplying more electric power to the target vehicles as a whole.

More specifically, the third embodiment adopts a method of supplying electric power to a vehicle having a relatively low SOC with priority among a plurality of target vehicles. In general, when the SOC approaches a fully charged state during charging of a battery, there is used control for preventing overcharging of the battery by reducing electric power to be supplied per unit time as compared with the case of a low SOC. Therefore, a vehicle having a high SOC may receive less electric power than a vehicle having a low SOC in the same period. By supplying electric power to the vehicle having a relatively low SOC with priority, more electric power can be supplied to the power shortage area.

Figure 11:
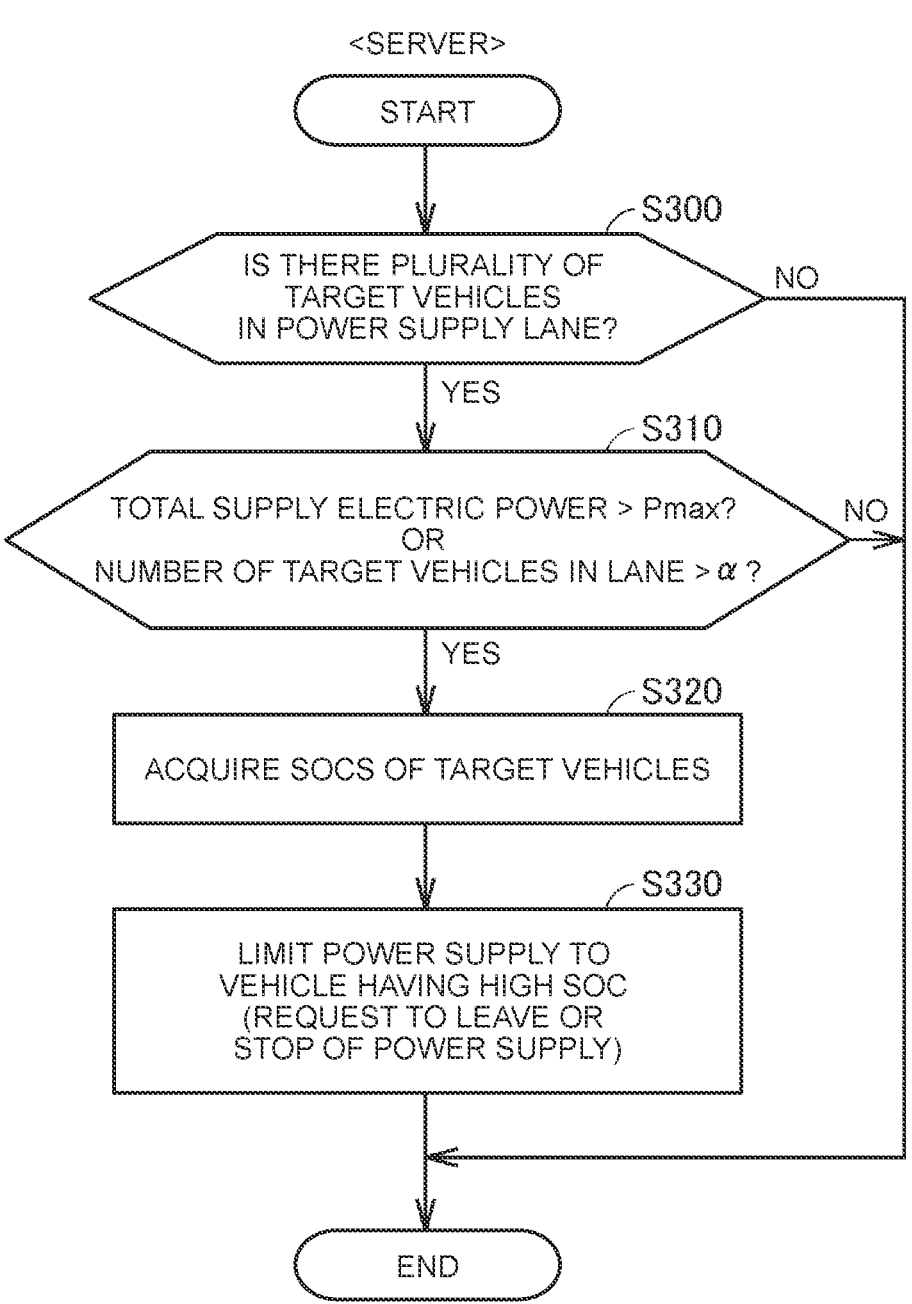
FIG. 11 is a flowchart illustrating a process of priority power supply control to be executed by a server in a third embodiment.

FIG. 11 is a flowchart illustrating a process of priority power supply control to be executed by the server 300 in the third embodiment. In S300 of FIG. 11, the server 300 determines whether a plurality of target vehicles whose destinations are the power shortage area is present in the range of the power transmission device 200 in the power supply lane 610. When no target vehicle is present or when one target vehicle is present (NO in S300), the server 300 skips the subsequent process to terminate the process. When one target vehicle is present, the process in FIG. 6 is subsequently executed to limit the power supply operation for a non-target vehicle.

When a plurality of target vehicles is present (YES in S300), the process proceeds to S310, and the server 300 determines whether electric power can be supplied from the power transmission device 200 to all the target vehicles. Specifically, the server 300 calculates total supply electric power to be supplied to the target vehicles, and determines whether the calculated total supply electric power exceeds maximum suppliable electric power Pmax of the power transmission device 200. Alternatively, determination may be made as to whether the number of target vehicles traveling in the power supply lane 610 is larger than a predetermined threshold value α.

When the power transmission device 200 has sufficient suppliable electric power and the electric power can be supplied to all the target vehicles (NO in S310), the server 300 skips the subsequent process and executes the process in FIG. 6. When the electric power cannot be supplied to all the target vehicles (YES in S310), that is, when the total supply electric power exceeds the maximum suppliable electric power Pmax or when the number of target vehicles exceeds the predetermined threshold value α, the process proceeds to S320, and the server 300 acquires SOC information from each target vehicle.

In S330, the server 300 limits the power supply operation for a vehicle having a relatively high SOC. More specifically, the server 300 adjusts the total supply electric power from the power transmission device 200 to a value equal to or smaller than the maximum suppliable electric power Pmax by reducing the electric power to be supplied to the vehicle having a high SOC or stopping the power supply to this vehicle. Further, the vehicle that is not supplied with electric power may be notified of a request to leave the power supply lane 610.

Then, the server 300 executes the process described in FIG. 6 to limit the power supply to the non-target vehicle.

When the number of target vehicles in the power supply lane exceeds the number at which electric power can be supplied from the power transmission device, the power supply efficiency for all the target vehicles can be increased and more electric power can be supplied to the power shortage area by performing the control in accordance with the process described above.

Third Modification

In a third modification, description will be given of a configuration in which, when a plurality of target vehicles is present, the electric power to be supplied to the target vehicles is limited based on the priority levels of the power shortage areas set as the destinations.

As described in FIG. 3, there are various factors that lead to the power shortages in the power shortage areas. A long period may be required for recovery from a power outage as in a case of an area suffering from a disaster or significant damage to a power transmission and distribution facility. Further, the power shortage may be overcome in a short period as in a case of a temporary excess of demand due to supply and demand balancing or the presence of backup equipment and bypass circuits. That is, the degree of urgency or imperative for supplementing electric power differs depending on the factor in the power shortage. In the server 300, priority levels are set for the power shortage areas in association with the factors in the power shortages.

In the third modification, more electric power is supplied to an area having a strong need for electric power supplementation by supplying, with priority, electric power to a vehicle heading for a destination having a high priority level set as described above.

Figure 12:
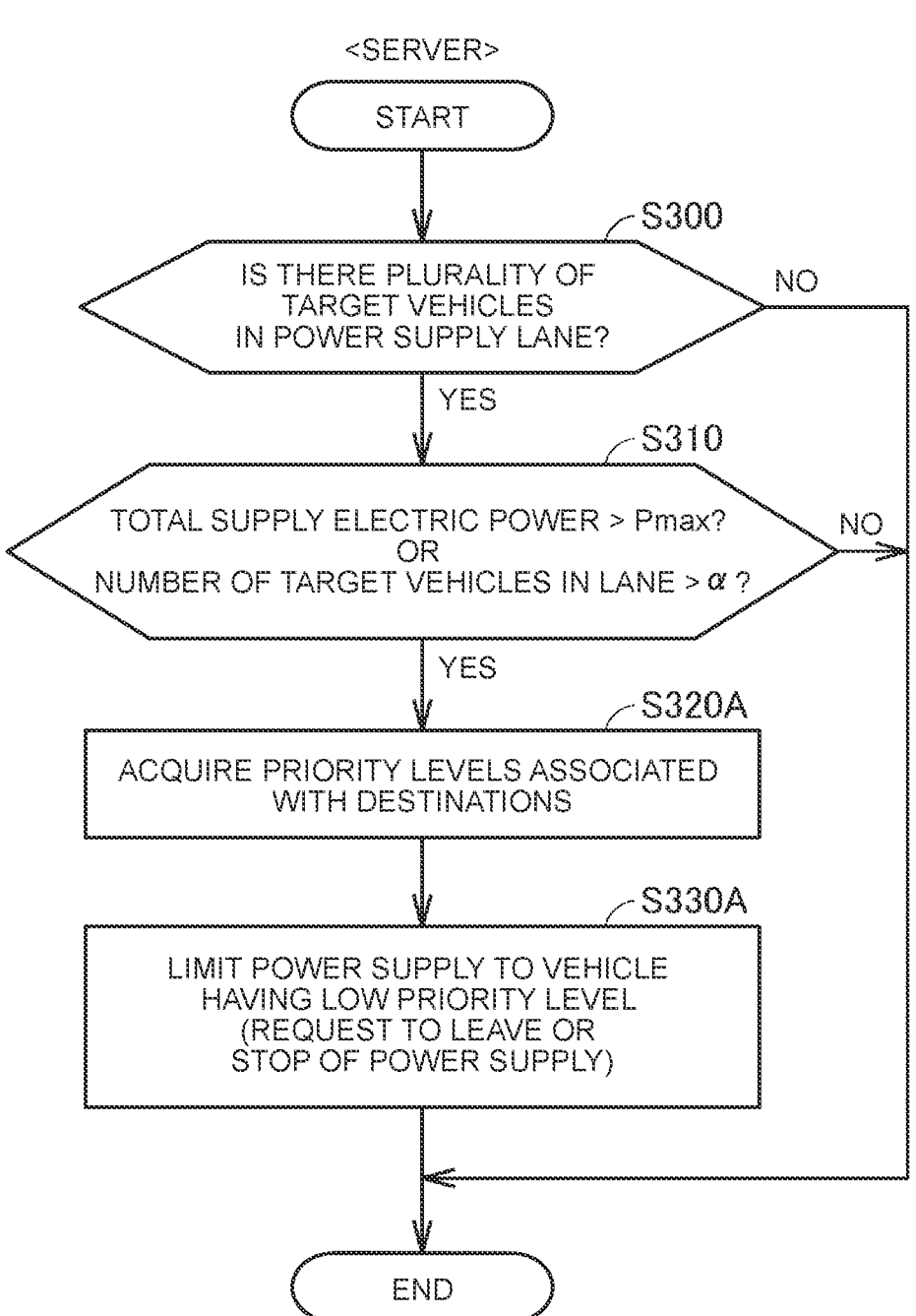
FIG. 12 is a flowchart illustrating a process of the priority power supply control to be executed by the server in a third modification.

FIG. 12 is a flowchart illustrating a process of the priority power supply control in the third modification. In the flowchart of FIG. 12, Steps S320 and S330 in the flowchart described in FIG. 11 are replaced with Steps S320A and S330A, respectively. In FIG. 12, the description of the steps overlapping the description in FIG. 11 will not be repeated.

Referring to FIG. 12, when a plurality of target vehicles is present in the power supply lane 610 (YES in S300) and the electric power cannot be supplied to all the target vehicles (YES in S310), the process proceeds to S320A, and the server 300 acquires priority levels for the destinations of the target vehicles by referring to the map database 330. In S330A, the server 300 limits the power supply operation for a vehicle having a relatively low priority level, thereby adjusting the total supply electric power from the power transmission device 200 to a value equal to or smaller than the maximum suppliable electric power Pmax. Then, the server 300 executes the process described in FIG. 6 to limit the power supply to the non-target vehicle.

When the number of target vehicles in the power supply lane exceeds the number at which electric power can be supplied from the power transmission device, more electric power can be supplied to an area having a strong need for electric power supplementation by performing the control in accordance with the process described above.

In the second and third embodiments and the second and third modifications, the ECU of the vehicle may perform the priority power supply control as in the first modification.

The embodiments disclosed herein should be considered to be illustrative and not restrictive in all respects. The scope of the present disclosure is shown by the claims rather than by the above description of the embodiments, and is intended to include all modifications within the meaning and scope equivalent to the claims.

A server according to a first aspect of the present disclosure is configured to communicate with a first vehicle and a second vehicle. Each of the first vehicle and the second vehicle includes a power storage device configured to be charged by wirelessly receiving electric power from a power transmission device arranged on a road during traveling. The server includes a storage device that stores information on a power shortage area; and a processor configured to: acquire a destination of the first vehicle and a destination of the second vehicle; and limit a charging operation for the second vehicle when the destination of the first vehicle is included in the power shortage area stored in the storage device, the destination of the second vehicle is not included in the power shortage area, and the first vehicle is charged on the road.

With such a configuration, in a system capable of contactlessly (wirelessly) supplying electric power to traveling vehicles, the power supply to the vehicle whose destination is not the power shortage area (second vehicle) is limited. Therefore, the electric power can be supplied, with priority, to the vehicle whose destination is the power shortage area (first vehicle). Thus, it is possible to secure more electric power that can be supplied to the power shortage area.

In the first aspect, the road may include a first lane where the power transmission device is arranged, and a second lane where the power transmission device is not arranged; and the processor may be configured to limit the charging operation for the second vehicle by notifying the second vehicle of information for preventing entry into the first lane.

Such a configuration reduces the occurrence of a case where the vehicle whose destination is not the power shortage area enters the power supply lane (first lane). Therefore, the electric power can be supplied, with priority, to the vehicle whose destination is the power shortage area.

In the first aspect, the processor may be configured to, when the second vehicle is traveling in the first lane, limit the charging operation for the second vehicle by notifying the second vehicle of information for requesting the second vehicle to leave the first lane.

With such a configuration, even when the vehicle whose destination is not the power shortage area is traveling in the power supply lane and performing the power supply operation, the power supply operation can be stopped and the vehicle can be caused to leave the power supply lane. Thus, the electric power can be supplied, with priority, to the vehicle whose destination is the power shortage area.

In the first aspect, the processor may be configured to, when the second vehicle is performing the charging operation on the road, limit the charging operation for the second vehicle by transmitting a command to the power transmission device to reduce the electric power to be supplied to the second vehicle.

In the first aspect, the processor may be configured to, when the second vehicle is performing the charging operation on the road, limit the charging operation for the second vehicle by transmitting a command to the power transmission device to stop power supply to the second vehicle.

With such a configuration, even when the vehicle whose destination is not the power shortage area is traveling in the power supply lane, the electric power to be supplied to the vehicle can be reduced or the power supply to the vehicle can be stopped. Thus, the electric power can be supplied, with priority, to the vehicle whose destination is the power shortage area.

In the first aspect, the processor may be configured to, when a plurality of vehicles is performing the charging operation on the road and total electric power to be supplied to the vehicles exceeds suppliable electric power of the power transmission device: acquire state of charge of each of the vehicles; and limit the charging operation for a vehicle of which the state of charge is high as compared with the charging operation for a vehicle of which the state of charge is low, the vehicles having destinations set to the power shortage area and being configured to wirelessly receive the electric power from the power transmission device.

In the first aspect, the processor may be configured to, when a plurality of vehicles is performing the charging operation on the road and the number of the vehicles exceeds a predetermined number: acquire state of charge of each of the vehicles; and limit the charging operation for a vehicle of which the state of charge is high as compared with the charging operation for a vehicle of which the state of charge is low, the vehicles having destinations set to the power shortage area and being configured to be charged by the electric power from the power transmission device.

With such a configuration, when there is a plurality of vehicles whose destinations are the power shortage area and the electric power that can be supplied to one vehicle is limited, the electric power is supplied, with priority, to the vehicle having a low state of charge, that is, the vehicle that can store more electric power. Thus, it is possible to increase the electric power that can be supplied to the power shortage area.

In the first aspect, the storage device may store a priority level for each area included in the power shortage area; and the processor may be configured to, when a plurality of vehicles is performing the charging operation on the road and total electric power to be supplied to the vehicles exceeds suppliable electric power of the power transmission device: acquire the priority level for the destination of each of the vehicles; and limit the charging operation for a vehicle of which the priority level for the destination is low as compared with the charging operation for a vehicle of which the priority level for the destination is high, the vehicles having destinations set to the power shortage area and being configured to be charged by the electric power from the power transmission device.

In the first aspect, the storage device may store priority levels for areas included in the power shortage area; and the processor may be configured to, when a plurality of vehicles is performing the charging operation on the road and the number of the vehicles exceeds a predetermined number: acquire the priority levels for the destination of each of the vehicles; and limit the charging operation for a vehicle of which the priority level for the destination is low as compared with the charging operation for a vehicle of which the priority level for the destination is high, the vehicles having destinations set to the power shortage area and being configured to be charged by the electric power from the power transmission device.

With such a configuration, when there is a plurality of vehicles whose destinations are the power shortage area and the electric power that can be supplied to one vehicle is limited, the electric power can be supplied, with priority, to an area having a higher degree of imperative (priority level) in the power shortage area.

A power supply system according to a second aspect of the present disclosure includes a power transmission device arranged on a road; a first vehicle and a second vehicle; and a server configured to communicate with the first vehicle and the second vehicle, wherein: each of the first vehicle and the second vehicle includes a power storage device configured to be charged with electric power wirelessly received from the power transmission device during traveling; the server includes: a processor; and a storage device that stores information on a power shortage area; and the processor is configured to: acquire a destination of the first vehicle and a destination of the second vehicle; and limit a charging operation for the second vehicle when the destination of the first vehicle is included in the power shortage area stored in the storage device, the destination of the second vehicle is not included in the power shortage area, and the first vehicle is charged on the road.

A vehicle according to a third aspect of the present disclosure is configured to communicate with a server and wirelessly receive electric power from a power transmission device arranged on a road during traveling. The vehicle includes a power reception device configured to receive the electric power from the power transmission device; a power storage device configured to be charged with the electric power received by the power reception device; and a processor, wherein: the server stores information on a power shortage area; and the processor is configured to, when a destination of the vehicle is included in the power shortage area acquired from the server and the power storage device is charged with the electric power from the power transmission device arranged on a route to the destination: acquire information on a destination of a specific vehicle traveling on and around the power transmission device; and request the server to limit a charging operation for the specific vehicle when the destination of the specific vehicle is not included in the power shortage area.

What is claimed is:

1. A server configured to communicate with a first vehicle and a second vehicle, each of the first vehicle and the second vehicle including a power storage device configured to be charged by wirelessly receiving electric power from a power transmission device arranged on a road during traveling, the server comprising:
a storage device that stores information on a power shortage area and stores priority levels for areas included in the power shortage area; and
a processor configured to:
acquire a destination of the first vehicle and a destination of the second vehicle;
limit a charging operation for the second vehicle when the destination of the first vehicle is included in the power shortage area stored in the storage device, the destination of the second vehicle is not included in the power shortage area, and the first vehicle is charged on the road; and
when a plurality of vehicles is performing the charging operation on the road and the number of the vehicles exceeds a predetermined number:
acquire the priority levels for the destination of each of the vehicles, and
limit the charging operation for a vehicle of which the priority level for the destination is low as compared with the charging operation for a vehicle of which the priority level for the destination is high,
the vehicles having destinations set to the power shortage area and being configured to be charged by the electric power from the power transmission device.

2. The server according to claim 1, wherein:
the road includes a first lane where the power transmission device is arranged, and a second lane where the power transmission device is not arranged; and
the processor is configured to limit the charging operation for the second vehicle by notifying the second vehicle of information for preventing entry into the first lane.

3. The server according to claim 2, wherein the processor is configured to, when the second vehicle is traveling in the first lane, limit the charging operation for the second vehicle by notifying the second vehicle of information for requesting the second vehicle to leave the first lane.

4. The server according to claim 1, wherein:
the road includes a first lane where the power transmission device is arranged, and a second lane where the power transmission device is not arranged; and
the processor is configured to, when the second vehicle is traveling in the first lane, limit the charging operation for the second vehicle by notifying the second vehicle of information for requesting the second vehicle to leave the first lane.

5. The server according to claim 1, wherein the processor is configured to, when the second vehicle is performing the charging operation on the road, limit the charging operation for the second vehicle by transmitting a command to the power transmission device to reduce the electric power to be supplied to the second vehicle.

6. The server according to claim 5, wherein the processor is configured to, when the second vehicle is performing the charging operation on the road, limit the charging operation for the second vehicle by transmitting a command to the power transmission device to stop power supply to the second vehicle.

7. The server according to claim 1, wherein the processor is configured to, when the plurality of vehicles is performing the charging operation on the road and total electric power to be supplied to the vehicles exceeds suppliable electric power of the power transmission device:
acquire state of charge of each of the vehicles; and
limit the charging operation for the vehicle of which the state of charge is high as compared with the charging operation for the vehicle of which the state of charge is low,
the vehicles having destinations set to the power shortage area and being configured to wirelessly receive the electric power from the power transmission device.

8. The server according to claim 1, wherein:
the storage device stores a priority level for each area included in the power shortage area; and
the processor is configured to, when the plurality of vehicles is performing the charging operation on the road and total electric power to be supplied to the vehicles exceeds suppliable electric power of the power transmission device:

acquire the priority level for the destination of each of the vehicles; and limit the charging operation for the vehicle of which the priority level for the destination is low as compared with the charging operation for the vehicle of which the priority level for the destination is high, the vehicles having destinations set to the power shortage area and being configured to be charged by the electric power from the power transmission device.

9. The server according to claim 1, wherein the processor is configured to, when the plurality of vehicles is performing the charging operation on the road and the number of the vehicles exceeds the predetermined number:

acquire state of charge of each of the vehicles; and limit the charging operation for a vehicle of which the state of charge is high as compared with the charging operation for a vehicle of which the state of charge is low, the vehicles having destinations set to the power shortage area and being configured to be charged by the electric power from the power transmission device.

10. A power supply system comprising:

a power transmission device arranged on a road;

a first vehicle and a second vehicle; and a server configured to communicate with the first vehicle and the second vehicle, wherein:

each of the first vehicle and the second vehicle includes a power storage device configured to be charged with electric power wirelessly received from the power transmission device during traveling;

the server includes:

a processor; and a storage device that stores information on a power shortage area and stores priority levels for areas included in the power shortage area; and the processor is configured to:

acquire a destination of the first vehicle and a destination of the second vehicle;

limit a charging operation for the second vehicle when the destination of the first vehicle is included in the power shortage area stored in the storage device, the destination of the second vehicle is not included in the power shortage area, and the first vehicle is charged on the road; and when a plurality of vehicles is performing the charging operation on the road and the number of the vehicles exceeds a predetermined number:

acquire the priority levels for the destination of each of the vehicles, and limit the charging operation for a vehicle of which the priority level for the destination is low as compared with the charging operation for a vehicle of which the priority level for the destination is high, the vehicles having destinations set to the power shortage area and being configured to be charged by the electric power from the power transmission device.

11. A vehicle configured to communicate with a server and wirelessly receive electric power from a power transmission device arranged on a road during traveling, the vehicle comprising:

a power reception device configured to receive the electric power from the power transmission device;

a power storage device configured to be charged with the electric power received by the power reception device; and a processor, wherein:

the server stores information on a power shortage area and stores priority levels for areas included in the power shortage area; and the processor is configured to, when a destination of the vehicle is included in the power shortage area acquired from the server and the power storage device is charged with the electric power from the power transmission device arranged on a route to the destination:

acquire information on a destination of a specific vehicle traveling on and around the power transmission device;

request the server to limit a charging operation for the specific vehicle when the destination of the specific vehicle is not included in the power shortage area; and when a plurality of vehicles is performing the charging operation on the road and the number of the vehicles exceeds a predetermined number:

acquire the priority levels for the destination of each of the vehicles, and limit the charging operation for a vehicle of which the priority level for the destination is low as compared with the charging operation for a vehicle of which the priority level for the destination is high, the vehicles having destinations set to the power shortage area and being configured to be charged by the electric power from the power transmission device.

* * * * *